United States Patent [19]

Uchikawa et al.

[11] 4,131,474
[45] Dec. 26, 1978

[54] MOLDING SAND MIXTURES

[75] Inventors: Hiroshi Uchikawa, Funabashi; Hajime Kato, Yokohama, both of Japan

[73] Assignee: Onoda Cement Company, Ltd., Yamaguchi, Japan

[21] Appl. No.: 804,731

[22] Filed: Jun. 8, 1977

Related U.S. Application Data

[63] Continuation of Ser. No. 604,022, Aug. 12, 1975, abandoned.

[51] Int. Cl.² .............................................. B28B 7/34
[52] U.S. Cl. ............................ 106/38.35; 106/38.3; 106/90; 106/93; 106/98; 260/29.65
[58] Field of Search ................... 106/38.3, 38.35, 90, 106/93, 98, 102, 103, 315; 260/29.65

[56] References Cited

U.S. PATENT DOCUMENTS

| 3,628,973 | 12/1971 | Greening et al. | 106/102 |
| 3,664,854 | 5/1972 | Kokuta | 106/315 |
| 3,676,541 | 7/1972 | Nishi et al. | 106/90 |
| 3,775,143 | 11/1972 | Mikhailov et al. | 106/102 |
| 3,854,985 | 12/1974 | Suzuki et al. | 106/90 |
| 3,864,141 | 2/1975 | Uchikawa et al. | 106/315 |
| 3,885,985 | 5/1975 | Serafin et al. | 106/315 |
| 4,036,659 | 7/1977 | Stude | 106/315 |

Primary Examiner—Lorenzo B. Hayes
Attorney, Agent, or Firm—Oblon, Fisher, Spivak, McClelland & Maier

[57] ABSTRACT

This invention relates to mixtures of molding sand which comprise a mixture of a molding sand with a rapid hardening cement containing calcium aluminate as amorphous glass and/or crystals, and/or calcium haloaluminate, a polymer water holding agent and a lime, or mixture of a molding sand with the above-mentioned rapid hardening cement, a polymer water reducing agent, a lime, and, if necessary, a foaming agent, and in either case with water. The mixture also provides a method of mixing the ingredients except for water and then kneading the mixture with water.

6 Claims, No Drawings

MOLDING SAND MIXTURES

This is a continuation of application Ser. No. 604,022, filed Aug. 12, 1975, now abandoned.

BACKGROUND OF THE INVENTION

1. Field of the Invention

This invention relates to a method of preparing molding sand mixtures and the mixtures thereby obtained. More particularly, it relates to molding sand mixtures which harden in a short period of time, providing molds with high strength and good surface stability.

2. Description of the Prior Art

Prior art molding sand mixtures suffer from disadvantages in that their coefficients of utilization of floor area and operation efficiencies are low. This is true because when making molds of portland cement, long periods of time are consumed until the molds attain the desired compressive strength. As an earlier improved method to eliminate these disadvantages, we have developed self-hardening molding sand mixtures which comprise a mix of molding sand with a mixture of sulfate, or of sulfate and an organic carboxylic acid, with clinker powder containing calcium haloaluminate (11CaO.7Al$_2$O$_3$.CaX$_2$), or by further addition of a water reducing agent such as a $\beta$-naphthalenesulfonic acid-formalin condensation product. The molds made from these mixtures are hardened rapidly; but they have a disadvantageous tendency toward insufficient stability, especially when hardened at low temperatures. This is because of the deficiency of water necessary for the cement to hydrate near the surface and of the resulting incomplete bonding among the sand grains.

SUMMARY OF THE INVENTION

As a result of further studies for improvements in molding sand mixtures using not only rapid hardening cement containing calcium haloaluminate (11CaO.7Al$_2$O$_3$.CaX$_2$, X = halogen), but also rapid hardening cement containing calcium aluminate in the form of amorphous glass and/or crystals, we have found that a molding sand mixture is rapidly hardened to provide molds with proper strength and excellent surface stability, when made by first mixing the molding sand with a polymer water holding agent and a lime in addition to the aforementioned rapid hardening cements, followed by kneading with water. Also disclosed is that the use of a polymer water reducing agent in place of the aforementioned polymer water holding agent provides the molding sand mixture with better moldability, thereby permitting the formation of a hardened material with proper strength and molds with good surface stability. In addition, we have found that molds having better properties are made with higher efficiency, when a foaming agent which fluidizes the molding sand mixture is added to the molding sand mixtures containing the polymer water reducing agent.

DETAILED DESCRIPTION OF THE PREFERRED EMBODIMENTS

The following description of experimental results is typical of the results of various experiments.

The rapid hardening cements employed in the experiments described below are jet cement (a product of Onoda Cement Company, Limited, mineral composition: 11CaO.7Al$_2$O$_3$.CaF$_2$ 20.6%, 3CaO.SiO$_2$ 50.7%, CaSO$_4$ 15.3%) (hereinafter referred to as rapid hardening cement A) and the cement (hereinafter referred to as rapid hardening cement B) prepared as follows. The rapid hardening cement B is prepared by mixing normal portland cement and the following strength-improving agent in a ratio by weight of 1:3, 0.06 part by weight of potassium carbonate and 0.04 part by weight of citric acid as bench life controlling agents, with 100 parts by weight of silica sand. The aforementioned strength-improving agent is produced by fusing a mixture of white bauxite, lime stone and fluorite and then immediately cooling to afford a glassy material (SiO$_2$ 4.8%, Al$_2$O$_3$ 52.6%, Fe$_2$O$_3$ 0.8%, CaO 40.2%, MgO 0.5%, F 1.0%). The glassy material is ground to the Blaine specific surface area of 4900 cm$^2$/g. Then anhydrous gypsum with a Blaine specific surface area of 6800 cm$^2$/g is mixed with the ground glassy material in the ratio by weight of 1:1.1.

EXPERIMENT 1

100 parts by weight of Kawamura silica sand (No. 5) was mixed with 8 parts by weight of the rapid hardening cement A, 0 or 0.2 parts by weight of methylcellulose as a polymer water holding agent and 0 or 0.3 parts by weight of quicklime. Subsequently the mixture was kneaded with 6 parts by weight of water and the resultant sand mixtures were hardened as a test piece according to JIS Z-2604. On the other hand, 8 parts by weight of the rapid hardening cement B was employed in place of the rapid hardening cement A to form a mix with the same components as above. The resultant sand mixtures were hardened as a test piece under the same conditions. The hardened test pieces thus formed were tested for compressive strength and surface stability. (24 hours after kneading. All the tests of surface stability hereinafter are conducted on samples 24 hours after kneading). The results are listed in Table 1.

As the strength test of this invention, compressive strength was measured according to JIS Z-2604 (Japan Industrial Standard Z-2604). Surface stability was measured with a 6-mesh sieve mounted on a Sieve Analysis Machine provided with a vibrator. After 24 hours, each test sample was placed on the sieve and vibration was applied to the sieve and sample for one minute. Then the weight of sample was measured.

Surface Stability = $W/W0 \times 100$ (%) where
W0 is the initial weight of sample, and
W is the weight of sample after vibration

Table 1

| Kind of cement | Water holding agent part, by weight | Quick lime part, by weight | Compressive strength (kg/cm$^2$) | | | Surface stability (%) |
|---|---|---|---|---|---|---|
| | | | 1hr. | 2hrs. | 24hrs. | |
| Rapid hardening cement A | 0 | 0 | 0.2 | 4.0 | 20.2 | 87.3 |
| | 0 | 0.3 | 2.7 | 6.9 | 19.2 | 90.9 |
| | 0.2 | 0 | 0.2 | 4.1 | 22.6 | 97.4 |
| | 0.2 | 0.3 | 1.9 | 5.8 | 23.1 | 98.7 |
| Rapid hardening cement B | 0 | 0 | 0.4 | 1.8 | 14.4 | 85.4 |
| | 0 | 0.3 | 0.6 | 2.3 | 17.7 | 90.2 |
| | 0.2 | 0 | 0.4 | 3.0 | 17.6 | 98.8 |
| | 0.2 | 0.3 | 0.6 | 3.9 | 17.7 | 99.4 |

EXPERIMENT 2

100 parts by weight of Kawamura silica sand (No. 5) was mixed with 8 parts by weight of the rapid hardening cement A, 0 or 0.2 parts by weight of the polymer water reducing agent calcium methylnaphthalenesulfonate-formalin condensation product (the average number of naphthalene rings was 8), and 0 or 0.1 part by weight of quicklime. Subsequently the mix was kneaded with 6 parts by weight of water and the resultant sand mixtures were hardened on the pattern as a test piece. Additionally, 8 parts by weight of the rapid hardening cement B was mixed in place of the rapid hardening cement A as described above and the resultant sand mixtures were hardened as a test piece under the same conditions. The hardened materials thus formed were tested for compressive strength and surface stability with the results shown in Table 2.

Table 2

| Kind of cement | Water reducing agent part, by weight | Quick lime part, by weight | Compressive strength (kg/cm$^2$) | | | Surface stability (%) |
|---|---|---|---|---|---|---|
| | | | 1hr. | 2hrs. | 24hrs. | |
| Rapid hardening cement A | 0 | 0 | 0.2 | 4.0 | 20.2 | 87.3 |
| | 0 | 0.1 | 1.5 | 5.1 | 24.7 | 91.4 |
| | 0.2 | 0 | 0.3 | 3.2 | 29.4 | 98.2 |
| | 0.2 | 0.1 | 1.3 | 7.8 | 36.0 | 99.3 |
| Rapid hardening cement B | 0 | 0 | 0.3 | 1.8 | 14.4 | 85.4 |
| | 0 | 0.3 | 0.6 | 2.3 | 17.7 | 90.2 |
| | 0.2 | 0 | 0.4 | 3.0 | 18.7 | 98.0 |
| | 0.2 | 0.3 | 0.8 | 4.8 | 20.9 | 98.9 |

The above results demonstrate that the addition of either a water holding agent and quicklime or a water reducing agent and quicklime to the rapid hardening cement A or B results is an increase in the compressive strength and surface stability when compared with the results obtained when only one or more of these reagents is added.

This invention is based on these findings and relates to the process of molding and sand mixtures, and the resultant mixtures, which comprise either mixing the molding sand with a rapid hardening cement containing calcium aluminate as an amphorous glass and/or calcium haloaluminate as a rapid hardening component, a polymer water holding agent and a lime, or by mixing the molding sand with the above-mentioned rapid hardening cement, a polymer water reducing agent, a lime and, if necessary, a foaming agent, and thereafter kneading the mixture with water.

In this invention, the rapid hardening cement containing calcium aluminate in the form of amorphous glass as a rapid hardening component is prepared by adding to portland cement, fly ash cement, blast furnace cement or silica cement and if necessary, a bench life controlling agent, the following strength-improving agents. These strength-improving agents are prepared by adding 3–96% of anhydrous gypsum to an amorphous glass of calcium aluminate which was made by cooling a fused material consisting of CaO (20–80%) and $Al_2O_3$ (80–20%). The rapid hardening cement thus produced should contain preferably over 2% calcium aluminate amorphous glass.

In this invention, the rapid hardening cement containing crystals of calcium aluminate as the rapid hardening component can be formed by adding one or more kinds of $CaO.2Al_2O_3$, $CaO.Al_2O_3$, $12CaO.7Al_2O_3$ and the like, or a mixture of one or more kinds of $CaO.2Al_2O_3$, $CaO.Al_2O_3$, $12CaO.7Al_2O_3$ and the like to portland cement or anhydrous gypsum. On the other hand, the rapid hardening cement containing calcium haloaluminate is produced by adding anhydrous gypsum to clinker powder (obtained by heating a mixture of clay, lime stone, a halogenated compound and the like; mineral composition: $3CaO.SiO_2$ solid solution, $2CaO.SiO_2$ solid solution, $2CaO.Fe_2O_3$ - $6CaO.2Al_2O_3.Fe_2O_3$ solid solution in addition to calcium haloaluminate ($11CaO.7Al_2O_3.CaX_2$)) so that the $Al_2O_3/SO_3$ mol. ratio in the cement is 0.5–2.0, and, if desired, further mixing with a bench life controlling agent. The rapid hardening cement thus produced should contain over 2% $11CaO.7Al_2O_3.CaX_2$.

Suitable bench life controlling agents include carboxylic acids, oxycarboxylic acids, weak inorganic acids or their salts such as citric acid, sodium citrate, sodium gluconate, diketogluconic acid, tartaric acid, adipic acid, boric acid and sodium borate, hemihydrate gypsum, or sodium or potassium carbonate, sulfate and nitrite. The bench life controlling agent is employed in suitable amounts to control the handling time and the hardening time of the molding sand mixtures.

Suitable polymer water holding agents include methylcelluloses, polyvinyl alcohols, alginic acids, sodium alginates, polyethylene oxides or water-soluble melamine resins without water reducibility (for example, Melment F 300, a product of Showa Denko Company).

Suitable polymer water reducing agents include naphthalenesulfonic acid-formalin condensation products (salt, the number of naphthalene rings, over 5), methylnaphthalenesulfonic acid-formalin condensation products (salt, the number of naphthalene rings, over 5), methylnaphthalenesulfonic acid-naphthalenesulfonic acid-formalin copolycondensates (salt, the number of naphthalene rings, over 5), condensate salts of alkylaldehyde and creosote oil fractionated at b.p. of 200°–315° C. (55% of creosote oil), or polymer surface active agents such as water soluble melamine resins having not only water reducibility, but also water holdability (for example, Melment F 10, a product of Showa Denko Company).

Suitable limes include quicklime and slaked lime.

Suitable foaming agents include anionic, nonionic or cationic surface active agents such as polyoxyethylene nonylphenyl ether and high alcohol sulfonic acid esters.

In this invention the rapid hardening cements should be employed in amounts of 2–20 parts by weight relative to 100 parts by weight of the molding sand. Fewer than 2 parts by weight are not sufficient to harden the molding sand and more than 20 parts by weight are not suitable, since the gas permeability and refractoriness of the molds are reduced, although the strength of the hardened mold increases. A suitable amount of the polymer water holding agent is 0.01–1.0 parts by weight as an effective component relative to 100 parts by weight of the molding sand. Less than 0.01 part by weight is not sufficient for suitable effect, and more than 1.0 part by weight is also not suitable, since the desirable effect is not great and the gas permeability of the mold is reduced. The polymer water reducing agents should be used in amounts of 0.03–2.0 parts by weight as an effective component relative to 100 parts by weight of the molding sand. The addition of less than 0.03 parts by weight has little effect on the surface stability and strength of the molds, while the use of more than 2.0 parts by weight does not display the desirable effect to a great extent and is accompanied by increase of gas evolution from the mold during casting. Limes are preferably used within the range of 0.01 to 3.0 parts by weight relative to 100 parts by weight of the molding sand. The ratio of the amount of lime to the amount of molding sand is preferred to be adjusted corresponding to the temperature wherein the molding sand mixture is to be hardened. When it is hardened at or near room temperature, a suitable amount of the lime is 0.01–1.0 parts by weight relative to 100 parts by weight of the molding sand, but more than 1.0 parts by weight has little improving effects. When hardening is at temperatures lower than about 5° C., a suitable amount is 1.0–3.0 parts by weight and the use of less than 1.0 part by weight has the disadvantage that a long time is required for hardening.

Water is preferably added in amounts of 3–15 parts by weight relative to 100 parts by weight of the molding sand.

To 100 parts by weight of the molding sand, 0.01–1.0 part by weight of the bench life controlling agents and 0.01–0.5 parts by weight of the foaming agents are preferably employed.

Although it is not clear why the molding sand mixtures made according to the invention reduce hardening time and provide the molds with proper strength and good surface stability, it is theorized that the molding sand mixtures possessing a suitable moldability may be formed by the use of relatively small amounts of water, because of a synergistic action of the polymer water holding agents or the polymer water reducing agents and lime on the rapid hardening cements in the presence of water and because of retardance of the evaporation of the water from the surface of the mixtures and the molds until hardening starts. The polymer water reducing agents provide the molds with better properties than the polymer water holding agents do, probably because the former agents possess an ability to increase the strength of the cement in addition to the water holdability.

The use of the molding sand mixtures prepared according to this invention permits reduction of the hardening time of the molds and provides the molds with excellent surface stability.

EXAMPLE 1

To Kawamura silica sand (No. 5 according to JIS) were added a rapid hardening cement, a polymer water holding agent, a lime and a bench life controlling agent in the ratio given in Table 3 and the mixture was kneaded with water in the ratio shown in the same Table. The resulting molding sand mixes were tested for their bench lives together with the compressive strength and surface stability of the hardened materials. The results are presented in Table 4.

Table 3

| Mixture | | No. | 1 | 2 | 3 |
|---|---|---|---|---|---|
| Kawamura silica sand (No.5) part, by weight | | | 100 | 100 | 100 |
| Rapid hardening cement | kind | | I | II | III |
| | part, by weight | | 18 | 12 | 6 |
| Limes: Quick lime | part, by weight | | 0 | 0.1 | 0.3 |
| Slaked lime | part, by weight | | 0.3 | 0 | 0 |
| Polymer holding agent | kind | | Poval | Soluble melamine resin | Sodium alginate |
| | part, by weight | | 0.25 | 0.8 | 0.05 |
| Water | part, by weight | | 12 | 8 | 5 |

Note (1) The rapid hardening cements were produced by adding a variety of bench life controlling agents to jet cement which was also employed in the Experiments. The ratio of the bench life controlling agents to silica sand 100 parts by weight are as follows: I, boric acid 0.05 parts by weight; II, sodium gluconate 0.02 parts by weight; III, 0.

(2) The water-soluble melamine resin employed as a polymer water holding agent in Melton F 300, a product of Showa Denko Company.

Table 4

| | No. | 1 | 2 | 3 |
|---|---|---|---|---|
| Compressive strength (kg/cm$^2$) | 1 hr | 8.4 | 3.3 | 1.4 |
| | 2hrs | 18.3 | 10.5 | 5.9 |
| | 24hrs | 62.6 | 40.4 | 15.4 |
| Surface stability(%) | | 97.3 | 98.8 | 90.4 |

EXAMPLE 2

Rapid hardening components were prepared by grinding two kinds of glassy materials (a) and (b) (listed in Table 5) which were made of white bauxite, lime stone and fluorite, to the Blaine specific surface area of 4900 cm$^2$/g and mixing with anhydrous gypsum (Blaine specific surface area of 6800 cm$^2$/g) in the ratio of 1:1 and 1:1.1, respectively. Commercially available normal portland cement was mixed with the components thus obtained as a strength improving agent in the ratio by weight of 1:3 to produce the cements (a') and (b'). The cement (a') or (b') was mixed with a variety of bench life controlling agents to provide three kinds of cements, (a') - I, (a') - II and (b').

Table 5

| Component (1) | SiO$_2$ | Al$_2$O$_3$ | Fe$_2$O$_3$ | CaO | MgO | F | Total |
|---|---|---|---|---|---|---|---|
| Composition of glass (a) | 4.1 | 45.0 | 0.7 | 48.7 | 0.6 | 0.9 | 100.0 |
| Composition of glass (b) | 4.8 | 52.6 | 0.8 | 40.2 | 0.5 | 1.0 | 99.9 |

To Kawamura silica sand (No. 5) were added the aforementioned three rapid hardening cements, limes and the polymer water holding agents in the ratio given in Table 6 followed by adding water. Table 4 shows the results of tests for the bench lives of the molding sand mixtures thus prepared, and the compressive strength and surface stability of the hardened materials.

Table 6

| Mixture | | No. | 1 | 2 | 3 |
|---|---|---|---|---|---|
| Kawamura silica sand (No. 5) part, by weight | | | 100 | 100 | 100 |
| Rapid hardening cement | kind | | (a') - I | (a') - II | (b') |
| | part, by weight | | 10 | 15 | 6 |
| Slaked lime | part, by weight | | 0.1 | 0.25 | 0.3 |
| Polymer water holding agent | kind | | Methyl cellulose | Polyethylene oxide | Poval |
| | part, by weight | | 0.1 | 0.5 | 0.4 |
| Water | part, by weight | | 6 | 10 | 5 |

Note:

(1) The rapid hardening cement (a') - I was mixed with potassium carbonate 0.08 parts by weight and gluconic acid 0.02 parts by weight as the bench life controlling agents based on the silica sand 100 parts by weight. The rapid hardening cement (a') - II was mixed with potassium sulfate 0.4 parts by weight in place of the bench life controlling agent in case of (a') - I. The rapid hardening cement (b') was mixed with sodium nitrite 0.1 parts by weight and tartaric acid 0.04 parts by weight as the bench life controlling agents based on the silica sand 100 parts by weight.

(2) Of the polymer water holding agents, methyl cellulose is a product of Shin-etsu Chemical Industry Company (Metholose) and polyethylene oxide, a product of Seitetsu Kagaku Company and Poval, a product of Kuraray Company.

Table 7

| Property | No. | 1 | 2 | 3 |
|---|---|---|---|---|
| Compressive strength(kg/cm.) | 1hr | 1.1 | 1.7 | 0.4 |
|  | 2hrs | 3.8 | 5.1 | 1.2 |
|  | 24hrs | 22.8 | 30.2 | 10.8 |
| Surface stability | (%) | 93.8 | 95.9 | 93.3 |

EXAMPLE 3

Asari silica sand (No. 5) was mixed with the rapid hardening cements, the polymer water reducing agents, and limes, followed by being kneaded with water in the ratio shown in Table 8 to prepare the molding sand mixtures. Table 9 shows the results of tests for the bench lives of the mixtures, and the compressive strength and surface stability of the hardened materials.

Table 8

| Mixture | | No. | 1 | 2 | 3 | 4 | 5 |
|---|---|---|---|---|---|---|---|
| Kawamura silica sand (No.5) part, by weight | | | 100 | 100 | 100 | 100 | 100 |
| Rapid hardening cement | kind | | IV | V | VI | VII | VIII |
|  | part, by weight | | 10 | 8 | 15 | 6 | 4 |
| Limes | kind | | 0 | 0 | 0.10 | 0.02 | 0.25 |
|  | part, by weight | | 3 | 0.05 | 0 | 0.02 | 0 |
| Polymer water reducing agent | kind | | A | A+B | C | C | D |
|  | part, by weight | | 0.1 | 0.15+0.05 | 0.6 | 0.8 | 0.5 |
| Water | part, by weight | | 6 | 5 | 10 | 4 | 4 |

Note (1) The rapid hardening cements (IV-VIII) were prepared by adding a variety of bench life controlling agents to jet cement which was employed in the Experiments. The controlling agents and the ratio to the silica sand 100 parts by weight are as follows, IV, sodium borate 0.02 parts by weight; V, boric acid 0.025 parts by weight; VI, citric acid 0.05 parts by weight; VII, tartaric acid 0.01 parts by weight; VIII, no bench life controlling agent.

(2) Of the polymer water reducing agents, A is sodium β-naphthalenesulfonate-formalin condensation product (the average number of naphthalene rings, 8); A + B, calcium β-naphthalenesulfonate-calcium β-naphthalenesulfonate-formalin copolycondensate (the average number of naphthalene rings, 8); C, Melment F 10, a water-soluble melamine resin (a product of Showa Denko Company); and D, Pozzolith NL 1400. a polycyclic sulfonic acid salt (a product of Nisso-Master Builders Co., Ltd.).

Table 9

| Property | No. | 1 | 2 | 3 | 4 | 5 |
|---|---|---|---|---|---|---|
| Bench life time (min) | | 10 | 30 | 10 | 25 | 60 |
| Compressive strength (kg/cm$^2$) | 1hr | 5.8 | 0.5 | 13.2 | 1.2 | — |
|  | 2hrs | 10.2 | 8.2 | 15.1 | 4.8 | 0.4 |
|  | 24hrs | 39.3 | 37.6 | 72.0 | 20.1 | 6.2 |
| Surface stability (%) | | 95.9 | 99.1 | 99.2 | 96.9 | 81.2 |

EXAMPLE 4

Asari silica sand (No.5) 100 parts by weight was mixed with 8 parts by weight of jet cement with the same composition as employed in Example 1, sodium methylnaphthalenesulfonate-formalin condensation product or methyl cellulose 0.2 parts by weight, and quicklime 2.5 parts by weight, followed by adding water 5 parts by weight at 5° C. to provide two kinds of molding sand mixtures. Table 10 shows the results of tests for the bench lives of the mixtures, and the compressive strength and surface stability of the hardened materials. For comparison, the molding sand mixture made in the absence of quicklime was tested under the same conditions and the results are also listed in Table 10.

Table 10

|  | Quick lime part, by weight | Bench life time (min) | Compressive strength (kg/cm$^2$) | | | Surface stability (%) |
|---|---|---|---|---|---|---|
|  |  |  | 1hr | 2hrs | 24hrs |  |
| 1 | 2.5 | 10 | 1.3 | 7.2 | 39.6 | 99.8 |
| 2 | 0 | 180 | — | — | 24.0 | 90.2 |
| 3 | 2.5 | 10 | 1.4 | 3.5 | 21.3 | 96.2 |
| 4 | 0 | 180 | — | — | 11.2 | 88.4 |

Note:

In No.1 and No.2 is used sodium methylnaphthalenesulfonate-formalin condensation product (the average number of naphthalene rings, 8). In No.3 and No.4 methyl cellulose is employed.

EXAMPLE 5

To Enshu silica sand (No.6) were added the rapid hardening cements, limes, the polymer water reducing agents and then the mixture was kneaded with water in the ratio shown in Table 11 to provide the molding sand mixtures. Table 11 shows the results of tests for the bench lives of the mixtures, and the compressive strength and surface stability of the hardened materials.

Table 11

| Mixture | | No. | 1 | 2 | 3 | 4 |
|---|---|---|---|---|---|---|
| Enahu silica sand (No.6) part, by weight | | | 100 | 100 | 100 | 100 |
| Rapid hardening cement | kind | | (a')-III | (a')-IV | (b')-I | (b')-II |
|  | part, by weight | | 10 | 8 | 18 | 6 |
| Polymer water reducing agent | kind | | C | D | A | B |
|  | part, by weight | | 0.8 | 0.6 | 0.1 | 0.2 |
| Limes | kind | | Quick lime | Slaked lime | Quick lime | Quick lime |
|  | part, by weight | | 0.3 | 0.1 | 0.05 | 0.2 |
| Water | part, by weight | | 5 | 5 | 8 | 5 |

Note (1) Of the rapid hardening cements, (a')-III was produced by adding $K_2CO_3$ 0.08 parts by weight and citric acid 0.03 parts by weight (based on the silica sand 100 parts by weight) as the bench life controlling agents to the cement prepared by mixing the glassy material (a) (made in Example 2) with anhydrous gypsum and normal portland cement; (a')-IV, produced by the use of potassium sulfate 0.3 parts by weight in place of the bench life controlling agents employed for the preparation of (a')-III; (b')-I, produced by adding sodium nitrite 0.12 parts by weight and malic acid 0.08 parts by weight (based on the silica sand 100 parts by weight) as the bench life controlling agents to the cement made of the glassy material (made in Example 2), anhydrous gypsum and normal portland cement; (b')-II, produced by the use of potassium carbonate 0.1 parts by weight and boric acid 0.01 part by weight in place of the bench life controlling agents used for the preparation of (b')-I.

(2) The polymer water reducing agents, A, C and D are the same as employed in Example 3, and B is sodium methylnaphthalenesulfonate-formalin condensation product (the average number of naphthalene rings, 8).

(3) The foaming agents, a, b and c are a higher alcohol-sulfuric acid ester, a polyoxyethylene nonylphenyl ether and a mixture of nonionic and anionic surface active agents, Reoflude A (a product of Takemoto Resin Company), respectively.

Table 14

| Property | No. | 1 | 2 | 3 |
|---|---|---|---|---|
| Slump (%) | | 82 | 78 | 80 |
| Compressive strength(kg/cm$^2$) | 1hr | 8.1 | 4.2 | 1.2 |
| | 24hrs | 22.4 | 16.2 | 7.5 |
| Gas permeability | | 915 | 1020 | 1080 |
| Surface stability (%) | | 98.8 | 97.6 | 93.3 |

EXAMPLE 7

The rapid hardening cement employed in composed of the components shown in Table 15.

Table 15

| 11CaO.7Al$_2$O$_3$.CaF$_2$ | 3CaO.SiO$_2$ | 2CaO.SiO$_2$ | 4CaO.Al$_2$O$_3$.Fe$_2$O$_3$ | CaSO$_4$ |
|---|---|---|---|---|
| 35% | 23% | 4% | 8% | 28% |

A mixture of Amino silica sand (No.5), the above-mentioned rapid hardening cement, a lime, and either a polymer water reducing agent or polymer water holding agent was kneaded with water in the ratio shown in Table 16 to prepare molding sand mixes. Table 17 shows the results of tests for the bench lives of the mixes, and the compressive strength and surface stability of the hardened materials.

Table 12

| Property | No. | 1 | 2 | 3 | 4 |
|---|---|---|---|---|---|
| Bench life time (min) | | 20 | 30 | 25 | 10 |
| Compressive strength (kg/cm$^2$) | 1hr | 1.3 | 0.4 | 2.9 | 0.7 |
| | 2hrs | 4.2 | 2.8 | 8.3 | 2.7 |
| | 24hrs | 25.4 | 16.5 | 38.8 | 12.2 |
| Surface stability (%) | | 99.2 | 92.4 | 93.6 | 97.8 |

EXAMPLE 6

The molding sand mixes formed of the components and water in the ratio shown in Table 3 were poured into a wooden pattern for test piece of $\phi$50mm × 50mm and capped. The pattern was stripped off 40 minutes after kneading to provide samples for tests. Table 14 shows the results of tests for the compressive strength, gas permeability and surface stability.

Table 13

| Mixture | No. | 1 | 2 | 3 |
|---|---|---|---|---|
| Kozu silica sand (No.4) part, by weight | | 100 | 100 | 100 |
| Rapid hardening cement part, by weight | | 10 | 8 | 6 |
| Polymer water reducing agent | kind | B | B | A+B |
| | part, by weight | 0.2 | 0.1 | 0.2 |
| Limes | kind | Slaked lime | Slaked lime | Quick lime |
| | part, by weight | 0.8 | 0.5 | 0.5 |
| Forming agent | kind | a | b | c |
| | part, by weight | 0.05 | 0.2 | 0.1 |
| Water | part, by weight | 6 | 5.5 | 5 |

Note (1) The rapid hardening cement has the same composition as used in Example 1.

(2) The polymer water reducing agents, B and A+B are the same as used in Example 3.

Table 16

| Mixture | No. | 1 | 2 |
|---|---|---|---|
| Amino silica sand part, by weight | | 100 | 100 |
| Rapid hardening cement part, by weight | | 6 | 6 |
| Slaked Lime part, by weight | | 0.1 | 0.2 |
| Polymer water reducing agent part, by weight | | 0.2 | — |
| Polymer water holding agent part, by weight | | — | 0.15 |
| Water part, by weight | | 5 | 6 |

Note (1) The polymer water reducing agent employed is sodium $\beta$-naphthalenesulfonate-formalin condensation product (the average number of naphthalene rings, 8).

(2) The polymer water holding agent employed is Metholose, a product of Seitetsu Kagaku Company.

Table 17

| Property | No. | 1 | 2 |
|---|---|---|---|
| Compressive strength (kg/cm$^2$) | 1hr | 5.8 | 6.4 |
| | 2hrs | 17.7 | 15.3 |
| | 24hrs | 39.7 | 29.3 |
| Surface stability (%) | | 99.2 | 97.9 |

EXAMPLE 8

Water (50g) and concentrated sulfuric acid (200g) were poured into a creosote oil fractionated at 200°–275° C. and the mixture was heated for 3 hours at 160°–170° C. After dropwise addition of 37.2% formalin (100g), the mixture was reacted for 10 hours at 100° C. Following additional addition of water (30g), the mixture was heated for 20 hours with stirring and the product was converted to the sodium salt by liming sodation. The salt was dried in vacuo and employed as a polymer water reducing agent. Kawamura silica sand (No.5) was mixed with the polymer water reducing agent thus obtained, the rapid hardening cement, and a lime, and the mixture was kneaded with water in the ratio shown in Table 18 to give the molding sand mixture. The hard material made of the mix was tested for the compressive strength and surface stability, and the results are listed in Table 19.

EXAMPLE 9

To Enshu silica sand (No.6) 100 parts by weight, a variety of rapid hardening cements, a polymer holding agent and a bench life controlling agent were added, and the mixture was kneaded with water in the ratio given in Table 20 to prepare molding sand mixes. Table 21 shows the results of tests for the bench lives of the mixes and the compressive strength and surface stability of the resulting molds.

Table 20

| Mixture | | No. | 1 | 2 | 3 | 4 | 5 |
|---|---|---|---|---|---|---|---|
| Enshu silica sand (No.5) (part, by weight) | | | 100 | 100 | 100 | 100 | 100 |
| kinds of rapid hardening cement | Alumina cement (part. by weight) | | 3 | 2 | 5 | 2 | 2 |
| | Normal Portland Cement (part, by weight) | | 8 | 8 | 2 | 4 | 0 |
| | Jet Cement (part. by weight) | | 6 | 0 | 0 | 0 | 2 |
| | Anhydrous gypsum (part, by weight) | | 0 | 0.8 | 0 | 0.6 | 0 |
| | Quick lime (part, by weight) | | 0.8 | 0 | 0 | 0.8 | 0.5 |
| | Slaked lime (part, by weight) | | 0 | 0.2 | 0.05 | 0 | 0 |
| Polymer water holding agent | kind | | Methyl cellulose | Polyvinyl alcohol | Methyl cellulose | Water-soluble melamine | Polyvinyl alcohol |
| | part, by weight | | 0.05 | 0.1 | 0.2 | 0.1 | 0.3 |
| Bench life controlling agent | kind | | Tartaric acid | Boric acid | Adipic acid | Potassium carbonate citric acid | — |
| | part, by weight | | 0.04 | 0.04 | 0.02 | 0.1 +0.01 | — |
| Water | part, by weight | | 10 | 7 | 6 | 6 | 5 |

Table 18

| Kawamura silica sand part, by weight | 100 |
|---|---|
| Rapid hardening cement part, by weight | 8 |
| Polymer water reducing agent part, by weight | 0.2 |
| Slaked lime part, by weight | 0.3 |
| Water part, by weight | 5 |

Note: Jet cement is employed as a rapid hardening cement.

Table 19

| Compressive strength (kg/cm²) | 1hr | 2.2 |
|---|---|---|
| | 2hrs | 8.4 |
| | 24hrs | 34.8 |
| Surface stability (%) | | 99.0 |

Table 21

| Property | No. | 1 | 2 | 3 | 4 | 5 |
|---|---|---|---|---|---|---|
| Compressive strength (kg/cm²) | 1hr | 1.0 | 0.4 | 0.2 | 0.5 | 0.3 |
| | 2hrs | 7.5 | 3.9 | 3.4 | 2.3 | 1.7 |
| | 6hrs | 18.4 | 18.2 | 10.3 | 6.8 | 2.9 |
| | 24hrs | 48.8 | 24.6 | 19.3 | 15.6 | 7.7 |
| Surface stability (%) | | 90.4 | 93.7 | 97.2 | 98.7 | 92.1 |

EXAMPLE 10

With Kozu silica sand (No.4) 100 parts by weight, a variety of rapid hardening cements, polymer water reducing agents, bench life controlling agents and a foaming agent were mixed in the ratio given in Table 22 and the mixture was kneaded with water in the ratio shown in the same Table to prepare molding said mixes. Table 23 shows the results of tests for the strength and surface stability of the molds formed of the mixes.

Table 22

| Mixture | | No. | 1 | 2 | 3 | 4 | 5 |
|---|---|---|---|---|---|---|---|
| Kozu silica sand (No.4) (part, by weight) | | | 100 | 100 | 100 | 100 | 100 |
| Kinds of rapid hardening cement | Alumina cement (part, by weight) | | 4 | 2 | 1.5 | 3 | 2 |
| | Normal portland cement (part, by weight) | | 12 | 4 | 2.5 | 6 | 0 |
| | Jet cement (part, by weight) | | 0 | 0 | 0 | 0 | 6 |
| | Anhydrous gypsum (part, by weight) | | 0 | 1 | 0.5 | 0 | 0 |
| | Quick lime (part, by weight) | | 0 | 0.5 | 0.5 | 0 | 0 |
| | Slaked lime (part, by weight) | | 0.4 | 0.3 | 0 | 0.6 | 0.6 |
| Polymer water reducing agent | kind | | A | B | C | A | B |
| | part, by weight | | 1.2 | 0.1 | 0.4 | 0.8 | 0.25 |
| Bench life controlling agent | kind | | Malic acid | Boric acid | — | — | Citric acid |
| | part, by weight | | 0.04 | 0.01 | — | — | 0.03 |
| Foaming agent | kind | | — | — | — | a | — |
| | part, by weight | | — | — | — | 0.2 | — |

Table 22-continued

| Mixture | | No. | 1 | 2 | 3 | 4 | 5 |
|---|---|---|---|---|---|---|---|
| Water | part, by weight | | 10 | 4.5 | 4 | 7 | 5 |

Note (1) The polymer water reducing agents A - C are as follows:
 A: Water-soluble melamine resin (Melment F 10, a product of Showa Denko Company).
 B: Calcium methylnaphthalenesulfonate-formalin condensation product (the average number of naphthalene rings, 8).
 C: Calcium salt of methylnaphthalenesulfonic acid and naphthalenesulfonic acid-formalin copolycondensate (mol ratio, 1:1, the average number of naphthalene rings, 8).

(2) The foaming agent designated by "a" is polyoxyethylene nonylphenyl ether.

Table 23

| Property | No. | 1 | 2 | 3 | 4 | 5 |
|---|---|---|---|---|---|---|
| Compressive strength ($kg/cm^2$) | 1hr | 1.3 | 0.4 | 0.4 | 1.2 | 0.3 |
| | 2hrs | 8.7 | 2.4 | 2.3 | 3.6 | 5.2 |
| | 24hrs | 54.3 | 20.8 | 12.2 | 15.2 | 30.4 |
| Surface stability (%) | | 97.7 | 95.2 | 91.0 | 96.9 | 98.9 |

Note: The slump of sample No.5 is 78%.

What is claimed is:

1. A molding sand mixture comprising 100 weight parts of molding sand and a mixture containing
 (a) from 2-20 weight parts of a rapid hardening cement selected from the group consisting of:
  (i) calcium aluminate containing rapid hardening cement prepared by blending Portland cement, fly ash cement, blast furnace cement or silica cement with a mixture consisting of 3-96% by weight of anhydrous gypsum and a ground amorphous glass of calcium aluminate consisting of 20-80% CaO and 80-20% $Al_2O_3$;
  (ii) a calcium aluminate rapid hardening cement prepared by blending Portland cement, fly ash cement, blast furnace cement or silica cement with a mixture of 3-96% by weight of anhydrous gypsum and crystals of calcium aluminate consisting of $CaO.2Al_2O_3$, $CaO.Al_2O_3$, $12 CaO.7 Al_2O_3$ or mixture thereof;
  (iii) a calcium haloaluminate containing rapid hardening cement prepared by
   adding anhydrous gypsum to clinker powder consisting of $3CaO.SiO_2$ solid solution, $2CaO.SiO_2$ solid solution and $2CaO.Fe_2O_3 6CaO.2Al_2O_3.Fe_2O_3$ solid solution, and calcium haloaluminate having the formula $11 CaO.7 Al_2O_3.CaX_2$ where X is halogen and wherein the $Al_2O_3/SO_3$ mole ratio in the cement is 0.5-2.0; and
  (iv) mixtures thereof;
 (b) 3-15 weight parts of water;
 (c) from 0.01-1.0 weight parts of a polymeric water holding agent or from 0.03-2.0 weight parts of a polymeric water reducing agent; and
 (d) from 0.01-3.0 parts by weight of lime;
 wherein said polymeric water holding agent is methylcellulose, polyvinyl alcohol, alginic acid, sodium alginate, polyethylene oxide, or a water-soluble melamine resin;
 wherein said polymeric water reducing agent is naphthalenesulfonic acid formalin condensation product, an alkylnaphthalenesulfonic acid-formalin condensation product, an alkylnaphthalenesulfonic acid-naphthalenesulfonic acid-formalin copolycondensate, a polycondensate salt of alkylaldehyde and creosote oil fractionated at a b.p. of from 200° to 315° C. (55% of creosote oil), or a water-soluble melamine resin, wherein the number of naphthalene rings in said naphthalene-containing condensation products is more than 5.

2. The molding sand mixture of claim 1, additionally containing from 0.01-1.0 weight parts, per 100 weight parts of said molding sand, of a bench life controlling agent selected from the group consisting of citric acid, sodium citrate, sodium gluconate, diketogluconic acid, tartaric acid, adipic acid, boric acid, sodium borate, hemihydrate gypsum, sodium or potassium carbonate, sulfate or nitrate and dihydrate gypsum.

3. The molding sand mixture of claim 1 wherein the molding sand mixture contains a polymeric water reducing agent and from 0.01-0.5 weight parts, per 100 weight parts of sand, of a foaming agent comprising an anionic, a nonionic, or a cationic surfactant.

4. The molding sand mixture of claim 1, wherein the rapid hardening cement contains more than 2% amorphous glass of calcium aluminate therein.

5. The molding sand mixture of claim 1, wherein the rapid hardening cement contains more than 2% of crystals of calcium aluminate therein.

6. The molding sand mixture of claim 1, wherein the rapid hardening cement contains more than 2% of $11CaO.7Al_2O_3.CaX_2$.

* * * * *